United States Patent

[11] 3,580,094

| [72] | Inventor | Charles E. Kraus<br>Allendale, N.J. |
|---|---|---|
| [21] | Appl. No. | 853,429 |
| [22] | Filed | Aug. 27, 1969 |
| [45] | Patented | May 25, 1971 |
| [73] | Assignee | Excelermatic, Inc. |

[54] MOTION TRANSMISSION DRIVE
16 Claims, 7 Drawing Figs.

[52] U.S. Cl. ..................................................... 74/242.11C
[51] Int. Cl. ........................................................ F16h 7/12
[50] Field of Search .......................................... 74/242.11,
242.9, 242.14, 242.1, 242.8

[56] References Cited
UNITED STATES PATENTS
| 3,483,688 | 12/1969 | Hollyday | 74/242.11X |
| 3,496,918 | 2/1970 | Finlay | 74/242.11(X) |

*Primary Examiner*—Leonard H. Gerin
*Attorney*—Theodore L. Bowes

ABSTRACT: A traction drive with movable flange pulleys on parallel shafts which operates with a large amount of traction element sag, both on the tight and slack side, maintained by a dual roller tensioning means which, through servo means, compensates for load, wear, and ratio position by controlled flange movements.

MOTION TRANSMISSION DRIVE

BACKGROUND OF THE INVENTION

In a traction drive having a pair of movable flange pulleys on parallel shafts connected by a traction element having an appreciable amount of sag, the major problem is controlling the amount of sag that can develop due to wear, deflections, ratio position or overload. For safe operation under all conditions, control of the ratio of slack-side sag relative to tight-side sag is essential. In my continuation-in-part application, Ser. No. 753,941, filed Aug. 20, 1968, entitled Motion Transmission Drive, and assigned to the same assignee as the present application, such traction drives are disclosed. These drives included means in the ratio adjusting mechanism to compensate for traction element length requirements as a function of ratio position. With straight sided pulley flanges this requires a modification in the flange motions but it is found that there is an appreciable summation of deflections of flanges, shafts, housings, traction elements and adjusting means and the sag values vary as a function of load. A safe ration of sag:sag is difficult to maintain as the traction element lengthens due, for example, to bushing wear.

The invention disclosed herein has the following features and advantages.

My present invention substantially reduces or eliminates the need for fitting shims or adjustments ordinarily required to control the amount of chain sag and to reduce the need for or to eliminate all springs, one way nuts and separated roller supports presently employed on the roller tensioning means.

I contemplate adjusting the pulley flanges to take up for wear, load, or deflection by servo action controlled by the position of the roller tension means and there is provided a maximum ration of slack-to-tight side sag values which is maintained relatively constant by the servo-controlled means regardless of load, wear, deflections or ratio position. The ratio control means controls output speed droop by interaction of the ratio control means and the load influenced servo means and thus gives control over speed regulation.

The force of the two pulley flanges pushing against the traction element must be sufficient, when added together and multiplied by the average traction coefficient, to handle the net pull required for the power being transmitted. These forces also have a radial component, due to the angle of the flange surfaces, that put the traction element into tension. Both slack and tight sides are in tension, and the sum of the required pull forces must be available from the radial forces and the difference of the pull forces (net pull) must be available from the traction component due to these flange forces. The required ratio of tight-side-pull to slack-side-pull is found to be related to the traction coefficient and the flange angle and independent of center distance. This ratio of P/P closely approximates the ratio of slack-sag to tight-sag when such sag amounts are put into the traction element by equal side forces, as is done by having a roller on each side which is supported only by the opposite roller and otherwise free to float crosswise of the traction element. It follows sag/sag being equivalent to P/P is also a function of traction coefficient and flange angle, and is independent of center distance.

If the sidewise float of the roller assembly is restrained, it is found that, for a given position, i.e., sag ratio, the force on the tight side roller is not affected appreciably but the obstructing force is taken away from the slack side roller and the effective traction coefficient decreases. Only, if, by restraint of the roller assembly, the operating P/P value is less than the permissible P/P value for the particular drive, can a force be safely applied to the tight side roller. The maximum possible force would be available if the operating P/P equaled unity.

As an illustration, suppose the tight-side-pull for a given drive load and geometry is 800 pounds, the slack-side-pull is 400 pounds, and the effective average traction coefficient is 0.05. The operating P/P is 800/400 or 2. The force on the two rollers is equal and the sag values are approximately inverse of the pull values. If, by restraint of the roller assembly the sag is made approximately even on each side, it would be possible to apply a force of about half of the new roller force due to the 800 pounds and the new sag. In this instance the allowable force would be about 150 pounds at most. We assume, of course, that the force does not move the roller but the roller moves the force.

If it is desired to use this force and roller assembly movement to move the pulley flanges to compensate for ratio position, or for other reasons such as wear, it is found completely impractical. The total flange contact forces in this illustration would be 400 pounds divided by 0.05 or 8,000 pounds on each pulley, a total of 16,000 pounds on two pulleys to be balanced by about 150 pounds. A leverage of over 100 to 1 would be required. To move the flanges even 0.01 inch would require a roller assembly movement of an inch and even a fourth of that would decidedly decrease the available 150 pounds.

It is, therefore, arranged, in a typical application of this invention, to use roller tension means with roller pivot points fixed relative to the two rollers. The total amount of sag, tight side plus slack side, is thus built into the drive and remains essentially constant under all conditions. This tension means is guided for motion sidewise or transversely of the traction element but is not restrained by housing or guide means. In operation, the tension means moves to one side or the other, depending on which pulley drives and the direction of rotation, an amount to give a predetermined value of sag/sag. At such positions the tension means, by servo with negligible force, moves the pulley flanges of one or both pulleys towards each other. This flange movement tightens the traction element and balances the tension element at that position. The relative movements of the pulley flanges and the tension means can be equal or some low multiple, as may be convenient in connecting operating linkage, and so change in operating sag/sag value is negligible whether flange movement is made because of ration position length requirements, deflections due to load, or increased length of traction element due to wear of such things as pins or bushings.

Flange movements caused by the servo means are, of course, reversed when the cause of the required movement is removed and the flanges return to a position of preload contact when the roller assembly moves toward center on removal of load. In other words, flange movements are in proportion to load, total deflections, and ratio position length requirements and are removed when these needs are gone. Traction element wear merely changes slightly the point in roller tension means movement that the servo action is picked up.

When the servo means is operating, the contact force can be made sufficient for any overload but until the tension means has moved to one side or the other enough to operate the servo-controlled flange movement assembly, it is necessary to maintain a safe contact force against the sides of the traction element. The preliminary safe contact force or preload is primarily required because of the inertia of the traction element and tension means. If these had no weight, a very small force would move the tension means to servo operating position. However, there is considerable inertia in these parts and sudden starts or torque reversals require that this preload force be appreciable. Compared to the maximum forces involved in overload conditions the preload is small, however, and its effects on drive life are slight.

Devices are disclosed in the prior art which harness the flapping of a belt or a toothed chain to effect the movement of flanges to take up slack in the belt that has developed because of wear. Typically, such devices use a ratchet device and do not reverse direction. They do not compensate for ratio position or apply flange pressure continuously as a function of load, and, as a matter of fact, they are incapable of producing much force due to the substantially in line tension members, except by inertial effects of the flapping motion. Such devices operate to eliminate sag, are nonreversible and cannot compensate for length requirements due to ration position and do not maintain a relative position of traction element to flange positions.

The following FIGS. illustrate apparatus for applying the principles of this invention:

GENERAL DESCRIPTION

Figure 1:
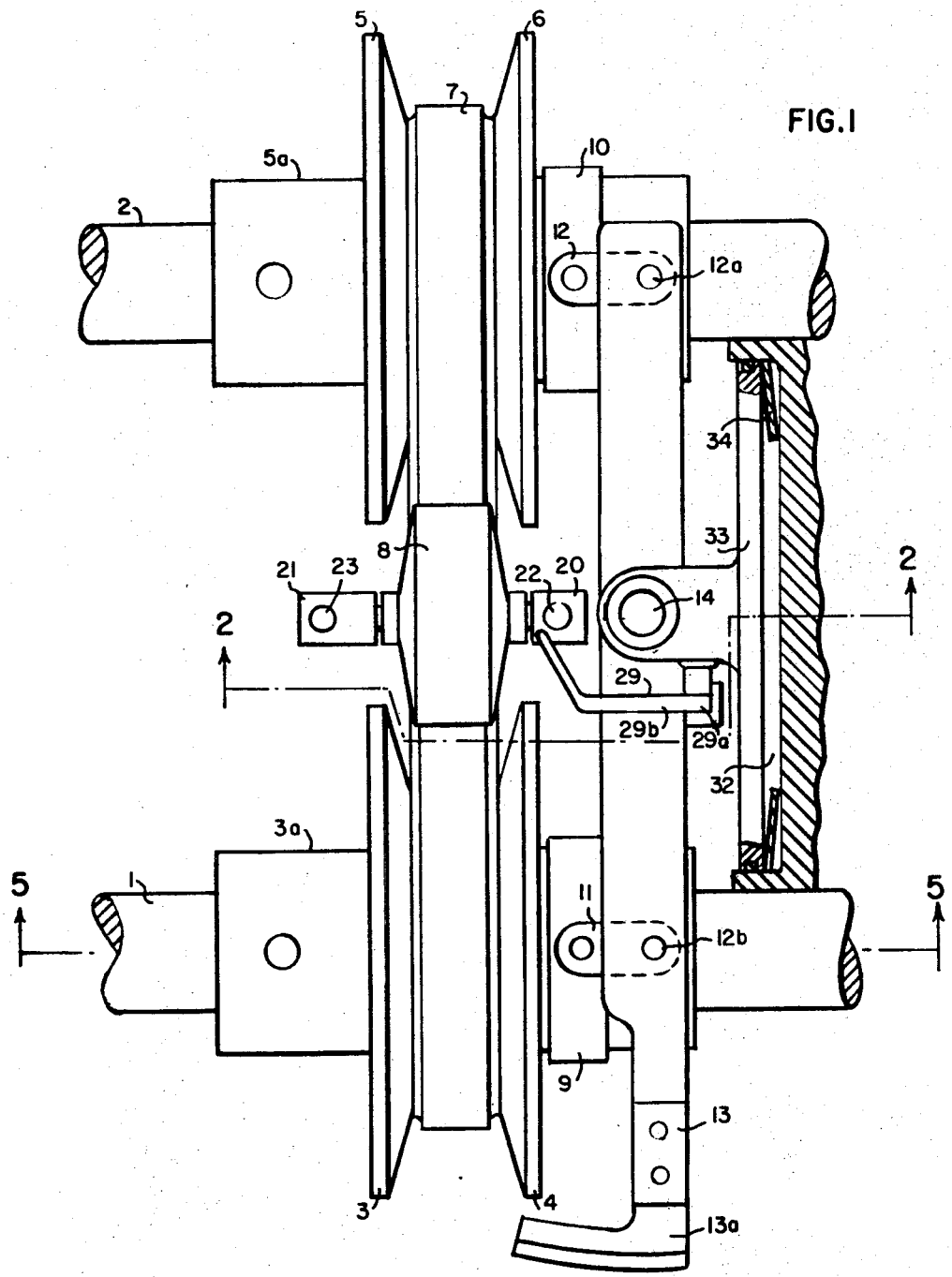
FIG. 1 is a schematic top view of a traction drive embodying the principles of my invention and showing the arrangement of parts.
Figure 2:
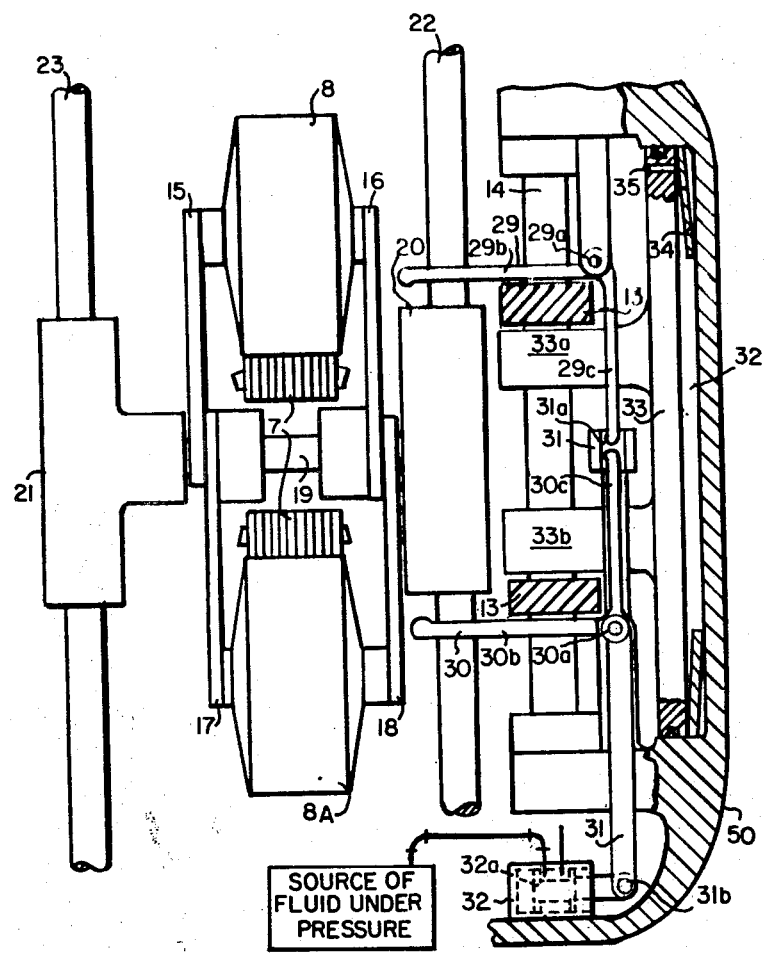
FIG. 2 is a schematic section taken along the line 2-2 of FIG. 1 showing the roller tension means and the servomechanism of FIG. 1.

There is shown in FIG. 1 a general view of an embodiment of a traction drive, such as illustrated in the aforementioned application, employing my invention including roller tension means for controlling the flange movements of a pair of two-part pulleys by servo action. Shafts 1 and 2 are arranged for parallel rotation on fixed centers. Support bearings and housing are not shown in the drawings except to a limited extent in FIG. 2. Two axially movable flanges 3 and 4, carried by shaft 1, combine to form a Vee pulley with straight sides on shaft 1 and two flanges 5 and 6 form a similar pulley on shaft 2. An endless traction element 7 links the two pulleys. As best shown in FIG. 2, tension roller 8 is shown engaging the upper side of the traction element 7 and a similar roller 8A is positioned to engage the underside. Flanges 4 and 6 have collars 9 and 10 respectively, which are, through links 11 and 12, connected to control lever 13 pivoted on member 14. Lever 13 may be moved by various means forming no part of this invention, such as by cylinder or gear means (not shown) cooperating with a gear section such as indicated at 13a. Moving the lever clockwise, as viewed in FIG. 1, about pivot 14 causes flanges 3 and 4 to move relatively toward each other as is described below, and similarly causes flanges 5 and 6 to move apart relatively to each other resulting in a change in the radius of the contact points of the traction element with the pulleys and, therefore, a change in drive ratio.

The arrangement of the roller tension means is best understood from FIG. 2. The two rollers 8 and 8A are shown in position against the traction member 7. These rollers are journaled on shafts attached to arms 15, 16, 17 and 18, respectively, which in turn are arranged to pivot on a shaft 19. With this arrangement, the distance between rollers is fixed. The shaft 19 is suitably carried between blocks 20 and 21, which are freely slidable on guide rods 22, 23. The roller tension means, consisting of rollers 8 and 8A, arms 15, 16, 17 and 18, shaft 19 and blocks 20 and 21, has a floating relationship to member 7, i.e., is unrestrained in movement up or down the guide member or rods 22 and 23 but is maintained in position crosswise or laterally relative to the longitudinal direction of the traction element 7 by the assembly described above. Arms 15, 16, 17 and 18 are arranged such that the two sides of the traction element 7 remain the same distance apart under all conditions of operation of the drive.

Figure 3:
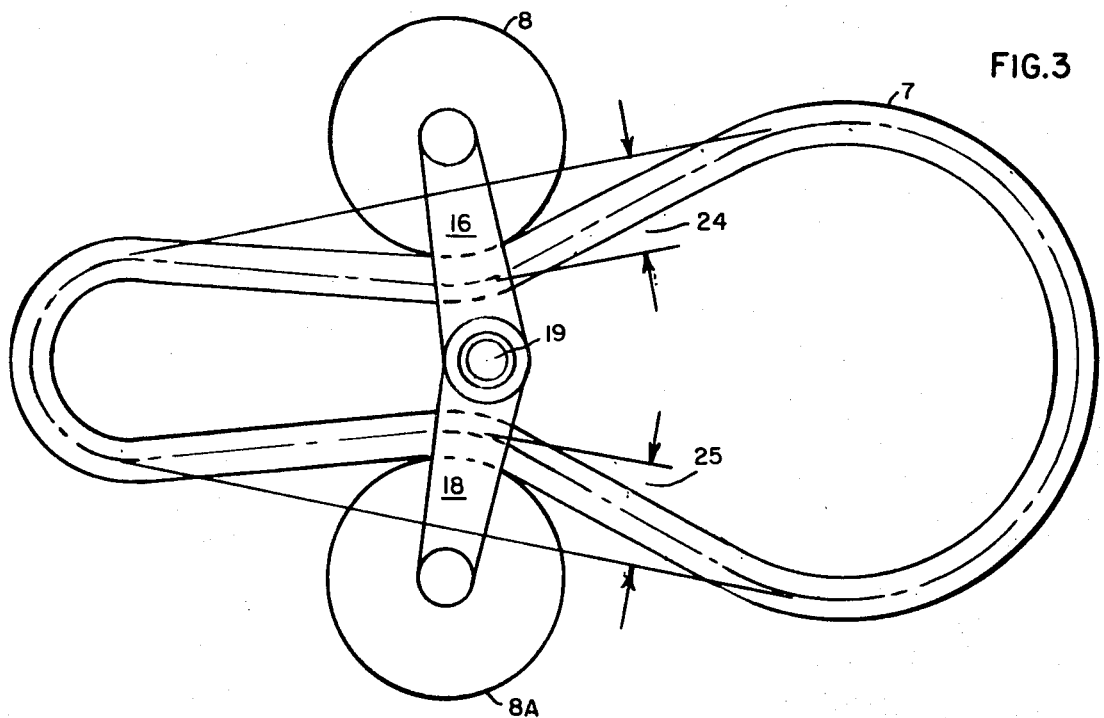
FIG. 3 is a schematic view illustrating the position of the traction element and roller tension means under no load conditions.

The arrangement may be better understood by referring to FIG. 3 showing only the traction element 7 and, schematically, the roller tension means with rollers 8 and 8A. FIG. 3 illustrates no-load conditions. The amounts of sag on the top and bottom are indicated by arrows 24, 25 respectively. Under no load, these sags 24 and 25 are equal.

Figure 4:
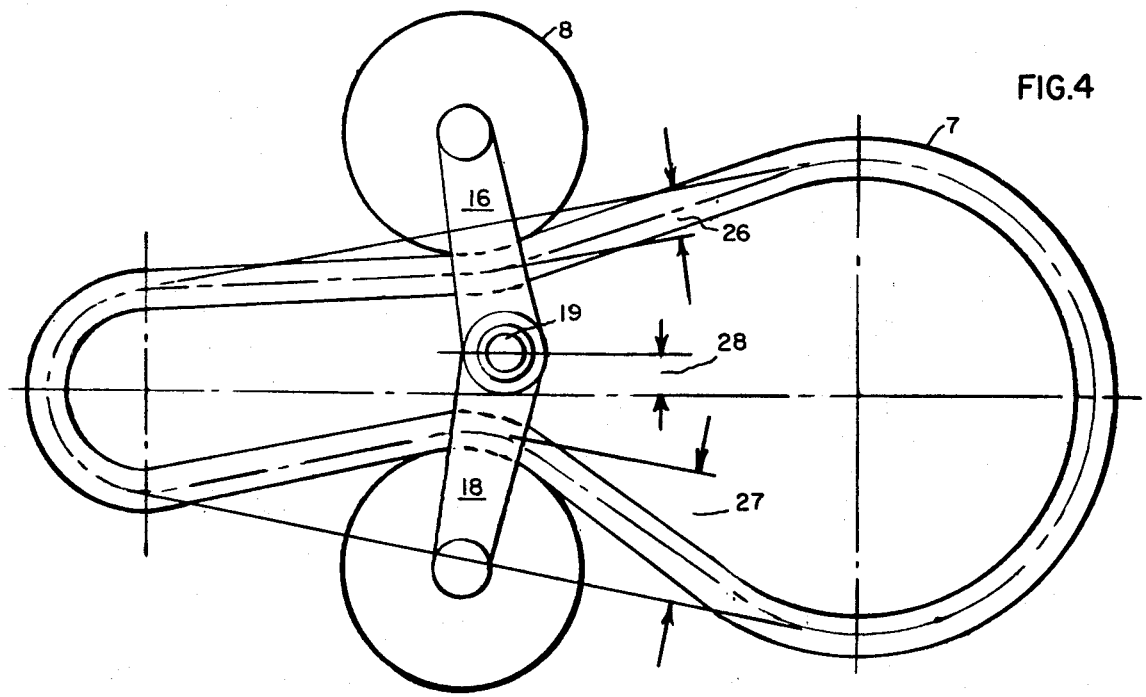
FIG. 4 is a similar view showing the positions of the same parts when the traction element is pulling.

If the drive is transmitting power, the elements shift to the positions shown in FIG. 4. The top of the traction element 7 is shown pulling and the roller tension means has been moved upward as shown by the position of shaft 19, a distance 28 from the no-load position. The upper sag 26 is now less than the sag 24 of FIG. 3, and the lower sag 27 is greater than the sag 25 of FIG. 3. For safe operation, as described in detail in the above-identified continuation-in-part application, the ratio of sag 27 to sag 26 cannot exceed a value which is a function of the traction coefficient and pulley flange angle. Means is therefore arranged so that when the roller tension means moves either up or down a distance 28 corresponding to such sag/sag limit, it will actuate servo means to move the pulley flanges closer together and therefore increase the traction element tension which stops the outward movement of the roller tension means.

Figure 5:
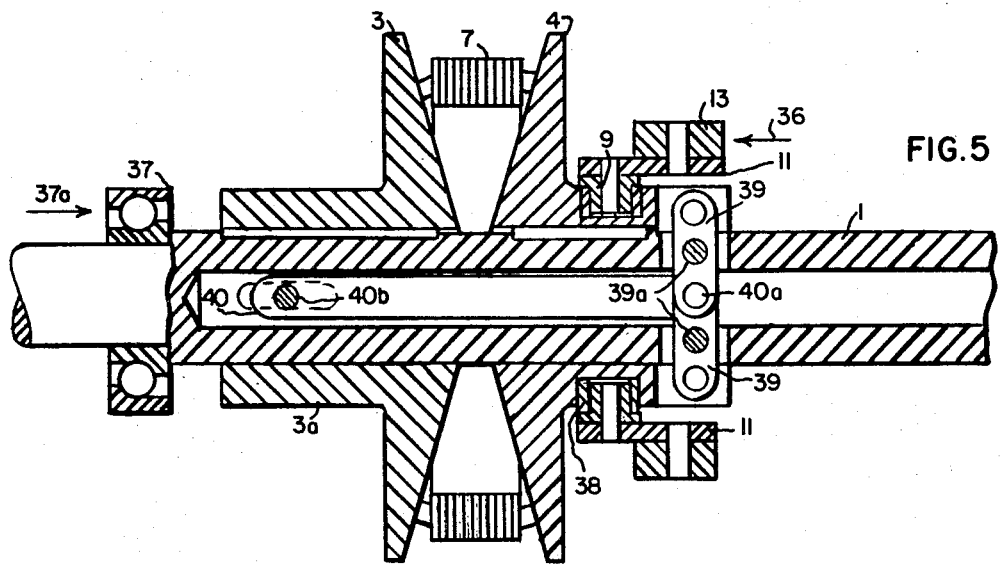
FIG. 5 is a cross-sectional view taken along the line 5-5 of FIG. 1 and showing a linkage used to connect two pulley flanges and locate the pulley relative to the associated shaft.

One arrangement to accomplish this servo-controlled pulley flange movement is shown in FIGS. 1, 2 and 5. Referring first to FIG. 2, two angled levers 29 and 30 are pivoted from housing lugs 29a and 30a, respectively, and positioned so that the free end of arm 29b or 30b is contacted by block 20 as block 20 moves a predetermined distance either side of its no-load position. The two adjacent ends of arms 29c and 30c of levers 29 and 30 terminate in an opening 31a in the end of lever 31, also pivoted on housing lug 30a, the other end of which is arranged to operate a suitable, preferably hydraulic, two-way valve 32. There is provided within a recessed portion of the drive housing, a portion of the housing being indicated by numeral 50 in FIG. 2, a reciprocable piston 33. Fluid, such as oil, under pressure from a pump (not shown) passes through the valve cylinder 32a in any suitable manner. Piston 33 is urged outwardly by a suitable belleville spring 34. By carrying control lever pivot member 14 in lugs 33a and 33b attached to the piston 33, the spring applies a force tending to move member 14 and hence both flanges 4 and 6 and therefore 3 and 5 against the traction element. Very little motion is required and the preload resulting from spring 34 is constant in amount regardless of ratio position.

In order to permit the necessary movement of member 14, this member may be supported from the casing in any suitable manner, as for example, by suitable links pivoted on member 14 and the casing.

Piston 33 is provided with a small aperture 35 which allows a continuous bleedoff of fluid. When valve 32 is not passing fluid, fluid bleeds out of aperture 35 until the spring 34 prevents further movement of the piston into the cylinder. Piston movement will occur due to deflections when the load increases and due to traction element 7 length requirements when the ratio position changes due to movement of adjusting lever 13 and consequent movement of pulley flanges. If wear has lengthened the traction element 7, spring 34 allows piston 33 to move back only a distance determined by the strength of the spring. Normal in and out piston movement is not affected. A very small movement of piston 33 compensates for all requirements. Maximum movement required for ratio position, for example is about 0.020 inch in a typical drive and the movement is inward from the normal position at the one-to-one ratio point.

FIG. 5 shows a cross section of pulley flanges 3 and 4 and shaft 1 of FIG. 1. Force, indicated by arrow, 36 is exerted by lever 13 through links 11 to collar 9. Collar 9, through bearing 38, applies this force to flange 4 where it divides. Half goes to the flange face and to the traction element 7 and half to the links 39 pivoted on shaft 1, as indicated by numeral 39a. The inner ends of links 39 are pivotally connected to link 40 at 40a. Link 40 is attached by pin 40b to the hub 3a of flange 3 and thus the other half of force 36 is reversed and applied through flange 3 to the other side of the traction element 7 as indicated by arrow 37a. The reaction force therefore is applied to the shaft bearings on the opposite sides of the drive.

Strength of the linkage inside of the shafts is limited and two bearings 37 and 38 on each shaft are subjected to the combined contact forces on both sides of the traction element. This adaptation would therefore be used for relatively low horsepower applications where simplicity and low cost are considerations. There are many well-known methods of confining the opposite forces on each side of a pulley for use of a belt or other type traction element, within the rotating assembly. Most variable pitch belt pulleys on the market use one or more of these means. They include springs, air or hydraulic cylinders, cams (with or without rollers), right- and left-hand screws, centrifugal weights, mercury, and various combinations of these.

Figure 6:
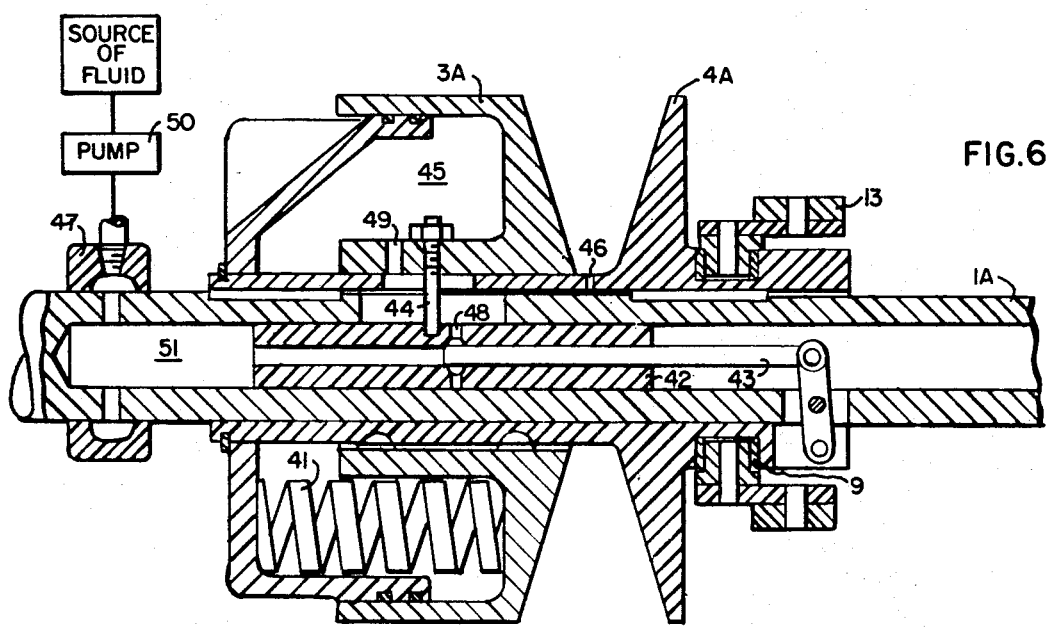
FIG. 6 is a cross-sectional view similar to that of FIG. 5 wherein a pulley is provided with spring preload means and the two pulley flanges are interconnected by hydraulic controlled means.
Figure 7:
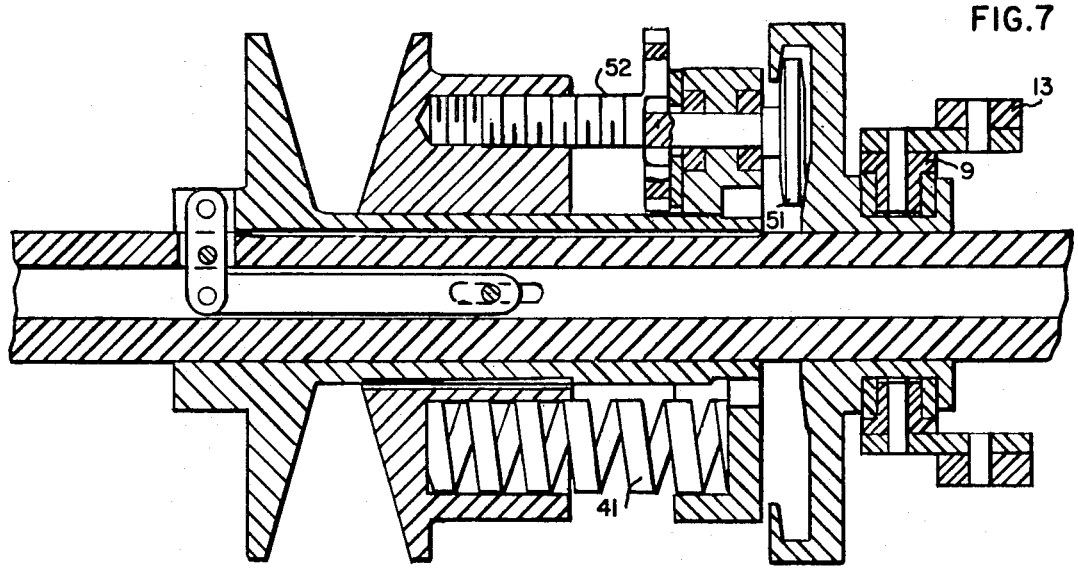
FIG. 7 is a cross-sectional view similar to that of FIG. 6 illustrating a mechanical jack screw arrangement with friction wheel actuation.

FIGS. 6 and 7 are presented to show that such means can be combined with the servo, controlled by chain sag, and used to compensate flange position for various needs. Ratio position is not controlled by these force balancing devices. Drive ratio is determined by movement and position of the ratio control lever 13. The sole purpose of these force balancing devices is to balance, partially or completely, the forces on opposite pulley flanges within the pulley and shaft assembly and therefore remove such force from bearings 37 and 38 and largely from the housing. Both FIGS. 6 and 7 show preload springs 41 built into the assembly but these are normally furnished only on the input pulley where it is possible, by designing suitable spring rates into springs 41, to furnish a preload roughly proportional to needs. Less preload is required when the traction element contacts are farther from shaft center. Springs in both pulleys would merely work against each other to no advantage.

Referring to FIG. 6, lever 13, when moving flange 4A towards center pulls the arm 43 out of the two-way valve 42 and admits fluid, through holes 48, 49, into cylinder 45. The valve body 42 is fastened to flange 3A by pin 44 and hence moves with it. Fluid from the pump 50 is introduced through the ring 47 to chamber 51 within shaft 1A. It will be seen then that flange 3A moves with arm 43 and the total force of both fluid pressure and springs against the flange 3A pushes against the back of the cylinder 45 which is attached to or part of the hub of flange 4A. Almost no force is required of lever 13 other than moving flange 4A along shaft 1A. Ball bushings may be incorporated at this point. Fluid will escape from many fits around the shaft and keys but an additional aperture 46 is provided between the flanges. Fluid leaving this aperture 46 is useful to lubricate the traction element and, when arm 43 stops the fluid flow into the cylinder 45 by closing opening 49, the bleed fluid will allow the flanges to separate until stopped by the force exerted by preload springs 41. Aperture 46 is also located to allow trapped air to escape as the heavier fluid is thrown to the outside.

The mechanical arrangement shown in FIG. 7 accomplishes the same thing in a different way and is intended only to illustrate another of the many ways the servo principle can be applied. Here collar 9 pushes or pulls against two or more friction wheels 51 which, through gears of suitable ration, rotate the jack screws 52 to move the flanges in or out. Preload springs 41 are again used and can push the flanges together by a slight sliding of the meshed gears. The internal links merely locate the pulley assembly relative to the shaft. This arrangement operates in one direction only and needs either a one-way clutch for protection or a reversing device to engage opposite sides of the friction wheels if the drive is reversed.

Both pulley arrangements of FIG. 6 and 7, by confining contact forces within the pulley assembly, permit movement of control lever 13 inward with very little force. Cylinder 32 (FIG. 2) therefore, can be small and spring 34, since in this embodiment does not furnish preload forces, may be quite light. If the force required to move lever 13 could be made as small as the force available, at the desired sag position, from the roller tension means, the cylinder could be eliminated and a direct linkage substituted. In such a case the force multiplication would be taken up by the simultaneous operation of the servo devices in the pulleys and the fundamental functioning of the invention would not be changed. It must be noted that when the roller tension means is positioned for the desired sag/sag ratio the roller forces are balanced and very small forces only can be tolerated without decreasing considerably the operating safety of the drive geometry.

It is not intended to limit the scope of this invention by the means shown and described. It is obvious that separate control levers 13 can be used for each side of the drive or other means used for ratio position adjustment. Levers, pivots and other constructions are only shown to indicate means to apply the principle of using traction element sag and sag control means, such as the roller tension means described, to operate a force multiplying servo means to move one or both flanges of one or both pulleys to compensate for the traction element length requirements due to ratio position, deflections due to overloads, changes in lengths, wear and so forth. This sag control means is not used to control ratio, which is separately controlled by the ratio control lever 13 or other independent means.

However, it should be noted that if shaft 2 in FIG. 1 is the driven shaft and piston 33 is pushed out by opening of servo valve 32 due to, and proportional to, load conditions, it will pivot lever 13 about the gear segment 13A and move flanges 5 and 6 a little farther than flanges 3 and 4. The net result is a speed-up of the output shaft which tends to counteract the normal speed droop of these drives due to load. By adjusting the point of pivoting lever 13 relative to the total drive deflections it is possible to control the speed droop curve and even in some cases to cause the output speed to increase slightly as a load increases.

In the above-identified copending application, there is provided a formula for determining the optimum chain length. I have determined that for best results, total sag provided should be at least one-eighth of the distance between the drive and the driven shafts.

As another variation of my invention, means may be provided whereby the flanges of one pulley are moved a proportional amount more than the flanges of the other pulley. In such a case, speed regulation may be provided as a function of load. This may be accomplished (referring to FIG. 1) by making the distance between pivot points 12a and 14 different from the distance between points 12b and 14.

I claim:

1. A power transmission drive comprising in combination a pair of shafts arranged in parallel relationship, a pulley on each of said shafts, an endless traction transmitting member connecting said pulleys, and means for applying tension to both tight and slack sides of said member, said tension applying means comprising a pair of rollers engaging the opposite outer sides of said member between said pulleys, said rollers being mounted in floating relationship to said member whereby said rollers are freely movable in a direction normal to said member, the distance between said rollers being fixed whereby the two sides of said member remain the same distance apart under all conditions.

2. The drive of claim 1 wherein there is provided tow pairs of arms, each roller is journaled between one pair of said arms, a pair of blocks, said arms are pivotally carried on a shaft which is carried between said blocks, a pair of guide members, said blocks being freely movable on said guide members, said guide members being normal to said traction transmitting member, whereby said rollers, arms, shaft, blocks and guide members provide a roller tension assembly for said traction member which is unrestrained in movement on said guide members and wherein the opposite sides of said traction member are maintained the same distance apart under all conditions of operation of the drive.

3. The drive of claim 2 wherein said moving means comprises a source of fluid under pressure and means responsive to said movement of said tension applying means for utilizing said fluid to effect said movement of the movable flanges according to the movement of said tension applying means.

4. The drive of claim 3 wherein said effected movement of the movable flanges is in accordance with the direction of movement of the tension applying means.

5. The drive of claim 2 wherein each pulley comprises flanges arranged for relative movement therebetween and means is provided for moving at least one flange of each of said pulleys in response to movement of said tension applying means.

6. The drive of claim 5 wherein said one flanges are moved simultaneously in opposite directions.

7. The drive of claim 5 wherein said one flanges are moved simultaneously in opposite directions.

8. The drive of claim 1 wherein each pulley comprises flanges arranged for relative movement therebetween and means is provided for moving at least one flange of each of said pulleys in response to a predetermined movement of said tension applying means.

9. The drive of claim 8 wherein said movement is reversible.

10. The drive of claim 8 wherein additional means is provided for moving said one flanges to effect a change of speed ration between said shafts.

11. The drive of claim 10 wherein additional means is provided for moving said one flanges to effect a change of speed ratio between said shafts.

12. The drive of claim 10 provided with means for moving the movable flange or flanges of one pulley more than the movable flange or flanges of the other pulley.

13. The drive of claim 8 wherein said one flanges are moved simultaneously in opposite directions.

14. The drive of claim 8 provided with means for moving the movable flange or flanges of one pulley more than the movable flange or flanges of the other pulley.

15. The drive of claim 1 wherein each pulley comprises flanges arranged for relative movement therebetween and wherein there is provided means for preloading said traction member by urging said flanges into engagement with said traction member, and means responsive to a predetermined movement of said tension applying means for moving at least one flange of each pulley in a direction to move said traction member to a different position with respect to said pulleys.

16. The drive of claim 1 wherein each pulley comprises flanges arranged for relative movement therebetween and means is provided for moving at least one flange of each of said pulleys to effect a change of speed ration between said shafts.